United States Patent [19]

Mizuhara et al.

[11] Patent Number: 4,837,816
[45] Date of Patent: Jun. 6, 1989

[54] COMMUNICATION SYSTEM USING SWITCHING APPARATUS

[75] Inventors: Noboru Mizuhara, Kawasaki; Tohru Hoshi, Yokohama; Jiro Kashio, Kawasaki; Takashi Morita, Yokohama, all of Japan

[73] Assignee: Hitachi, Ltd., Tokyo, Japan

[21] Appl. No.: 136,611

[22] Filed: Dec. 22, 1987

[30] Foreign Application Priority Data

Dec. 24, 1986 [JP] Japan ................ 61-306415

[51] Int. Cl.⁴ .................. H04M 3/22; H04M 7/06
[52] U.S. Cl. ........................ 379/221; 379/230
[58] Field of Search ........... 379/230, 208, 221, 220, 379/229

[56] References Cited

U.S. PATENT DOCUMENTS

| | | | |
|---|---|---|---|
| 4,163,124 | 7/1979 | Jolissaint | 379/220 |
| 4,166,929 | 9/1979 | Sheinbein | 379/207 |

FOREIGN PATENT DOCUMENTS

| | | | |
|---|---|---|---|
| 0119163 | 6/1985 | Japan | 379/208 |
| 0288549 | 12/1986 | Japan | 379/221 |

*Primary Examiner*—Thomas W. Brown
*Attorney, Agent, or Firm*—Pennie & Edmonds

[57] ABSTRACT

In a telephone switching apparatus having an interoffice interface consisting of a plurality of communication circuits having different priorities and a control line for transfer of call control signals, a first circuit having the highest priority is hunted from the idle one of said communication circuits upon setting of a call and the communication is started. During the communication, if a second circuit having a higher priority than that of the first circuit becomes idle, by communicating a control signal to switch the circuit between the switching apparatuses, the busy circuit for the call is switched from the first circuit of a low priority to the second circuit of a high priority.

3 Claims, 5 Drawing Sheets

| HD | ADR | ID | PCNO | NCNO | TL |

COMMUNICATION SYSTEM USING SWITCHING APPARATUS

BACKGROUND OF THE INVENTION

1. Field of the Invention

The present invention relates to a communication system and, more particularly, to a communication system capable of switching communication circuits and including a plurality of switching apparatuses which are mutually connected by a plurality of communication circuits and signaling lines (control line) for transfer of call control signals which are provided independently of the communication circuits, wherein during the period of time when two terminals (or telephones) are in the talking state after the setting of the calls has already been completed, the busy circuits between these terminals can be dynamically changed.

2. Description of the Prior Art

An inter-office interface constituted by communication circuits and a signaling link for transfer of call control signals which is provided independently of the communication circuits as mentioned above has been discussed as a common channel signal system in CCITT Recommendation Q. 701-Q. 795, 1984.

In the common channel signal system according to the CCITT Recommendation, with respect to the signaling link for transfer of call control signals, a circuit switching system has been described as a countermeasure when a signaling link failure occurred. However, nothing is considered with regard to the dynamic switching for the communication circuits.

SUMMARY OF THE INVENTION

It is an object of the present invention to provide a communication system in which during the period of time when two terminals are in the talking state, by dynamically switching the busy circuits between these terminals, the network resource can be effectively used and to provide a method of switching the circuits.

To accomplish the above object, according to the invention, in a communication system in which a plurality of switching apparatuses to each of which a plurality of terminal apparatuses (telephones or incoming trunks) are connected are mutually coupled through an inter-office interface consisting of a plurality of communication circuits having different priorities and one signaling link for transfer of call control signals, this communication system is characterized in that when the calls are set between two terminals, the communication circuit having the highest priority is hunted from the idle circuits of two switching apparatuses in which the respective terminals are enclosed, then the communication is started, and if the communication circuit having a higher priority than that of the hunted (present busy) circuit entered the idle state during the communication, a control signal to switch the circuits is communicated between the switching apparatuses through the signaling line and thereafter, the busy circuit between the terminals is switched from the present busy circuit to the idle circuit having the higher priority. To enable these circuit switching operations to be performed, according to the invention, a communication circuit hunt table in which the priorities are indicated for every route and a reservation table to register a reservation for the busy circuit are provided in a memory of each switching apparatus.

When each switching apparatus receives an address (or telephone number) of a destination terminal from an originating terminal enclosed in the relevant switching apparatus, the switching apparatus determines the route in correspondence to the destination address and refers to the circuit hunt table, thereby hunting the communication circuit having the highest priority from the idle communication circuits for the route determined. At this time, if a circuit having a higher priority than that of the hunted circuit exists in the present busy circuits, reserve information to use the busy circuit of the higher priority by the originating terminal in the case where the busy circuit of the higher priority entered the idle state is registered into the reservation table. The communication is started between two terminals by the hunted circuit. On the other hand, when one busy circuit is released after completion of the call (or communication), each switching apparatus checks by referring to the reservation table to see if the reserved call exists or not with respect to the released busy circuit. If the reserved call exists as the result of the check, the signal to switch the communication circuit to the idle circuit of the higher priority is sent from the switching apparatus through the signaling link to the partner switching apparatus of the communication circuit which is at present being used by the terminal which transmitted the reserved call. After that, the switching apparatus switches the communication circuit. The priority of the communication circuit is decided in accordance with the transmission quality, rental fee, transmission efficiency, or the like.

The foregoing and other objects, advantages, and manner of operation of the present invention will be understood from the following detailed description when read in connection with the accompanying drawings.

BRIEF DESCRIPTION OF THE DRAWINGS

FIG. 5 is a format diagram of control signals which are used to switch communication circuits.

DESCRIPTION OF THE PREFERRED EMBODIMENTS

Figure 1:
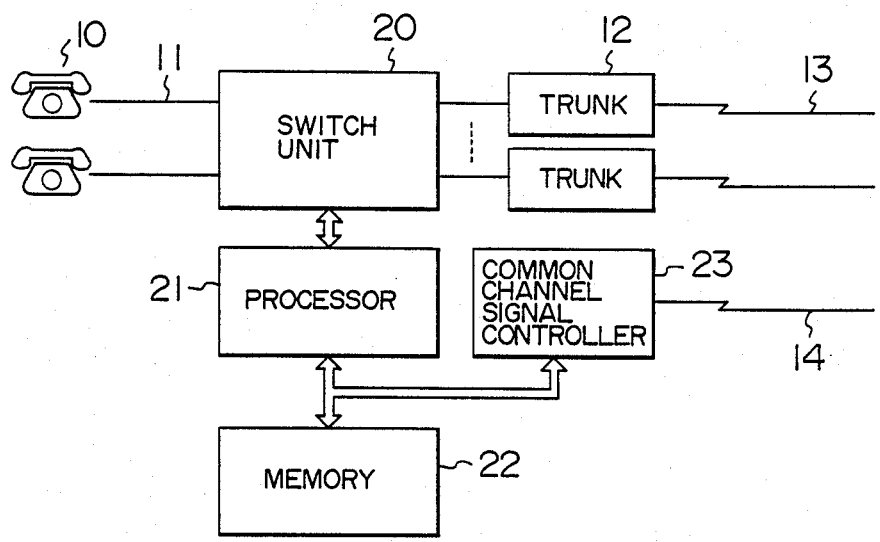
FIG. 1 is a whole constitutional diagram of a switching system to which the present invention is applied.

FIG. 1 is a constitutional diagram of a switching system to which the present invention is applied. In this embodiment, there are disclosed two switching apparatuses A,B having the same structure. In the switching apparatus A, reference numeral 10 denotes a terminal (or telephone) connected through a subscriber line 11 to a switch unit 20 constituting the main unit of the switching apparatus; 12 is a trunk; 13 a communication circuit; 14 a signaling link or a control line for transfer of control signals; 21 a processor to control the switch unit 20; 22 a memory to store a program by which the processor 21 operates and various kinds of control tables, which will be explained hereinafter; and 23 a common channel signal controller to transmit and receive call control signals to and from a partner office (switching apparatus) B through the signaling link 14 in response to a command of the processor 21. Switching apparatus B is also composed of elements 10' to 23' as in switching apparatus A.

Figure 2:
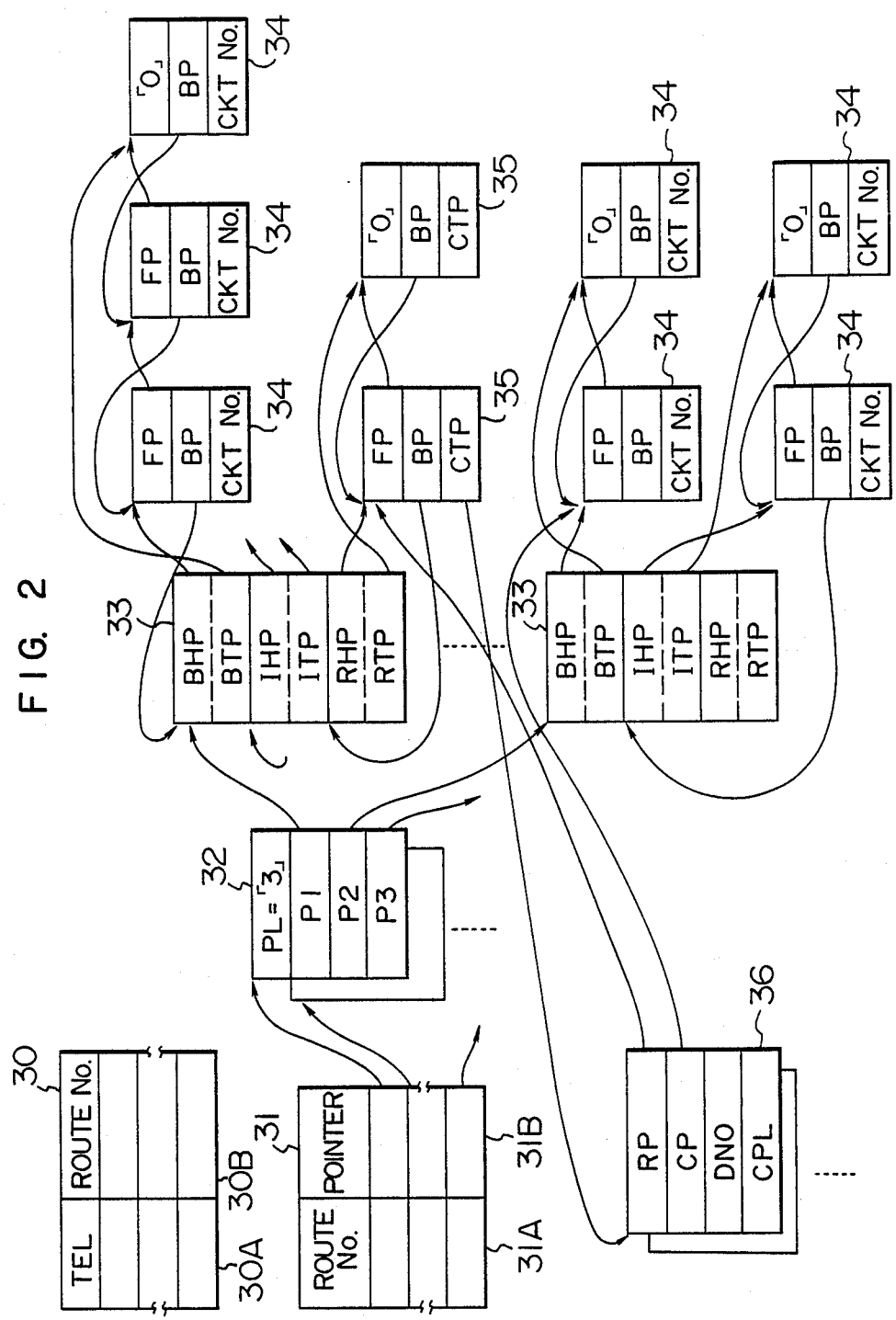
FIG. 2 is a diagram for explaining constitutions of various kinds of tables which are prepared in a memory of a switching apparatus and the mutual relation of these tables.

FIG. 2 shows constitutions of various kinds of tables which are prepared in the memory 22 in the switching apparatus to embody the invention. In the diagram, numeral 31 denotes a route branch table and 32 is a priority branch table. When the processor 21 receives the telephone number of the partner terminal from the originating terminal 10, the processor 21 decides the route on the basis of a route search table 30 indicative of the corresponding relation between a telephone number or office number 30A and a route 30B. Thereafter, in order to hunt one of the communication circuits assigned every route, the processor 21 searches the route branch table 31 using the normalized route number 30B, as a key, which was obtained from the table 30. A pointer 31B indicative of a chain address to the priority branch table 32 corresponding to a route number 31A is stored in the route branch table 31. On the other hand, pointers $P_1, P_2, \ldots, P_n$ indicative of chain addresses to a circuit hunt table 33, which will be explained hereinafter, and an indicator PL representative of the level number of the priority are stored in the priority branch table 32 for every priority.

Each circuit hunt table 33 comprises: a pointer BHP (Busy head pointer) representative of the head record indicative of the busy circuit among a plurality of circuit control records 34 constituting a circuit control table; a pointer BTP (Busy tail pointer) representative of the last record of the busy circuit; a pointer IHP (Idle head pointer) representative of the head record indicative of the idle circuit; a pointer ITP (Idle tail pointer) representative of the last record of the idle circuit; a pointer RHP (Reserve head pointer) representative of the head record among a plurality of reserved circuit control records 35 constituting the reservation table; and a pointer RTP (Reserve tail pointer) representative of the last record of the reserved circuit. Each record 34 in the circuit control table comprises: a circuit (CKT) number; a pointer FP (Forward pointer) to chain the next circuit control record in the forward direction; and a pointer BP (Backward pointer) to chain the next circuit control record in the backward direction. On the other hand, the reserved circuit record 35 comprises: a pointer CTP to chain a call control table, which will be explained hereinafter; and the pointers FP and BP to chain the next reserve record 35 in the forward and backward directions.

The call control table consists of a plurality of call control records 36 which are assigned every call. Each call control record 36 comprises: a pointer CP (Circuit pointer) to the circuit control record 34 to indicate the circuit number which was hunted by the relevant call; an indicator DNO (Destination number) indicative of the route; a priority level CPL (Circuit priority level) of the hunted circuit; and a pointer RP (Reserve pointer) to the reserved circuit record 36.

The line switching control operation by the processor 21 will now be explained hereinbelow with reference to program flowcharts shown in FIGS. 3 and 4.

Figure 3:
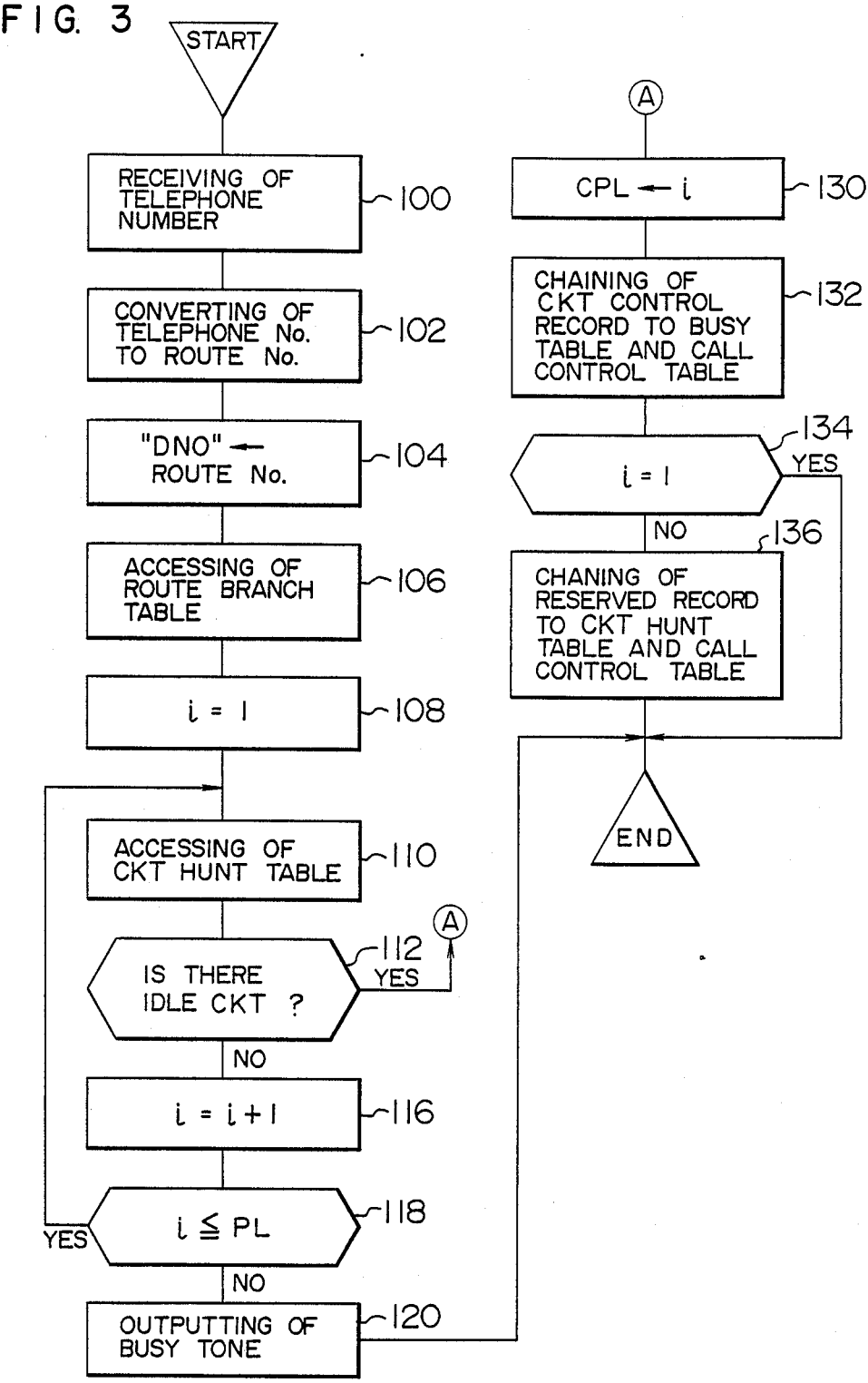
FIG. 3 is a program flowchart showing a control procedure to hunt a communication circuit which is executed when a call is generated.
Figure 4:
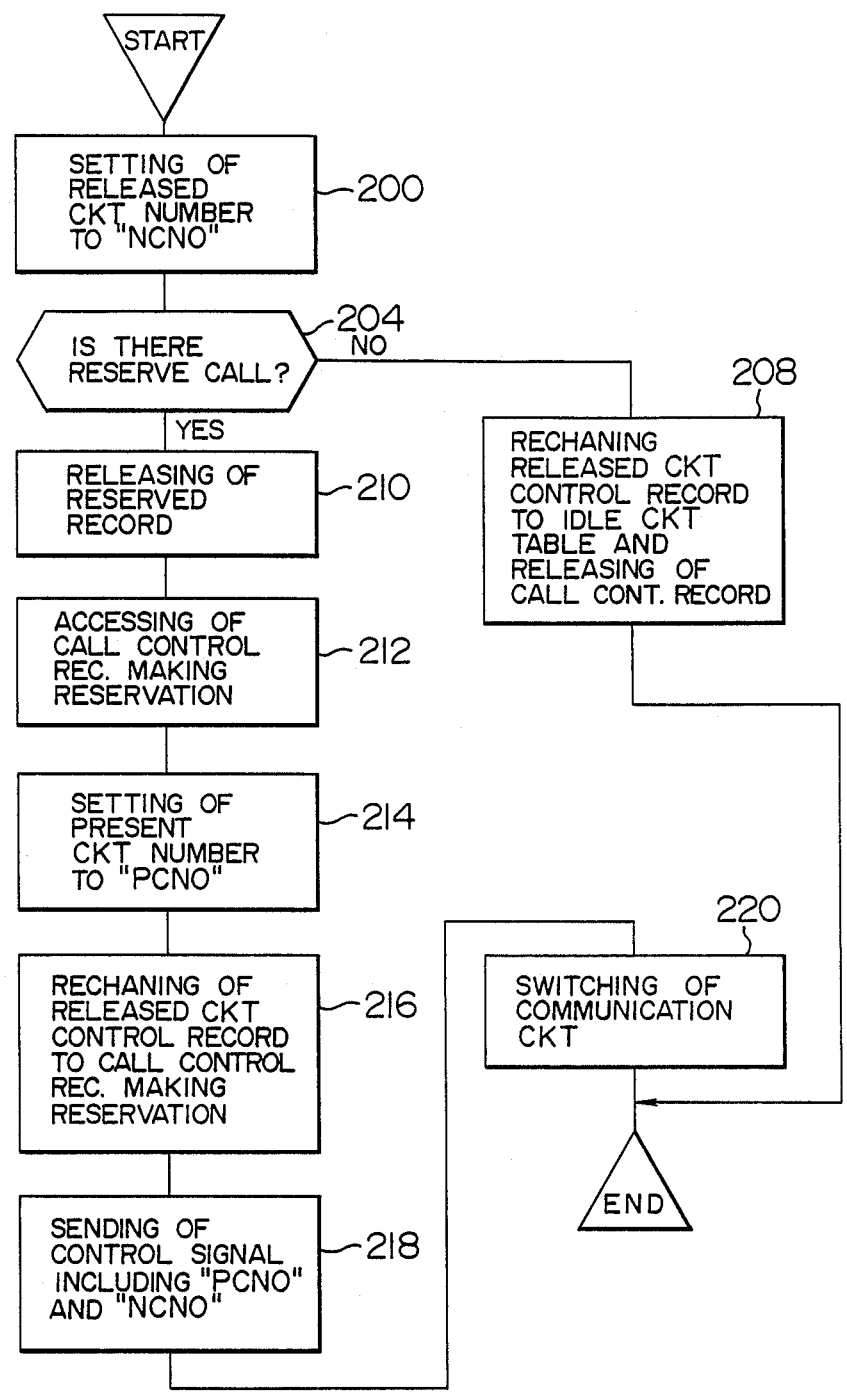
FIG. 4 is a program flowchart showing a control procedure to release and switch communication circuits which is executed upon completion of the call.

FIG. 3 shows a control procedure to hunt the line which is activated when it is detected that a call was generated (a telephone entered the off-hook state). When the telephone number of the partner office is input by the dialing from the originating terminal, it is received (step 100). The normalized route number is obtained by referring to the route search table 30 (step 102). Next, the new record 36 is set into the call control table in response to the call and the normalized route number is set into the DNO area (step 104). The priority branch table 32 corresponding to the route number is searched by referring to the route branch table 31 (step 106). In this embodiment, the presence or absence of the idle circuits is sequentially checked from the circuit having a higher priority and the circuit to be assigned to the relevant call is hunted. In step 108, therefore, the initial value "1" is set into a parameter i to sequentially read out the pointers $P_l$ to $P_n$ in the priority branch table 32 in accordance with the order of a higher priority and thereafter, one circuit hunt table 33 which is addressed by the i-th pointer $P_i$ is accessed (step 110). On the basis of the idle circuit pointers IHP and ITP stored in the table 33, the presence or absence of the idle circuit control record is checked (step 112). If it is determined that the idle circuit control record does not exist, the value of the parameter i is increased by only "1" (step 116). The value of i is compared with the value of the level number PL (step 118). If the value of i is equal to or smaller than the value of PL, this means that the circuit hunt table having a lower priority than the priority which has already been checked still remains. In this case, the processing routine is returned to step 110 and the foregoing checking processes are repeated on the basis of the circuit hunt table 33 which is addressed by the pointer $P_i$ corresponding to the updated parameter i. If the value of i is larger than the value of PL in step 118, it is decided that all of the circuits of the relevant route are busy. In this case, a busy tone is generated (step 120), thereby instructing the on-hook to the originating terminal.

If one of idle circuit control records 34 has been found out in the discriminating step 114, the value of the parameter i is set into the circuit priority level CPL of the call control record 36 corresponding to the relevant call (step 130). The pointers FP and BP of the idle circuit control record 34 which has been hunted at present are coupled with the busy circuit control record chain by reference to the pointers BHP and BTP in the circuit hunt table 33 and at the same time, the address of the circuit control record 34 is set into the pointer CP of the call control record 36 and both of the records 36 and 34 are linked (step 132). In the next step 134, a check is made to see if the value of the parameter i is the initial value "1" or not. If i="1", this means that a circuit having the highest priority could be hunted, so that the circuit hunting routine is finished. If i≠"1", step 136 follows and a circuit having a higher priority is reserved. The circuit reservation is made in such a manner that by reference to the circuit hunt table 33 corresponding to the highest priority level or the circuit hunt table corresponding to the level of the higher priority "i−1" from that of the circuit which is being hunted at present, the new reserved circuit record 35 is added to the chain of the existing reserved circuit record on the basis of the pointers PHP and PTP stored in the circuit hunt table 33. The address of the call control record 36 is set into the pointer CTR of the new reserved circuit record 35 and the address of the new reserve record 35 is set into the pointer RP of the call control record 36, so that these two records 35 and 36 are mutually linked. The values of the pointers BTP, IHP, and RHP in the circuit hunt table 33 are updated every time the foregoing busy circuit record or reserved circuit record is registered.

The control operation after completion of the call will now be explained with reference to FIG. 4.

If the end of call, i.e., the change to the on-hook state of the terminal which has been in the talking state so far is detected, the call control record 36 corresponding to this call is referred and the circuit number is derived from the circuit control record 34 which is addressed by the pointer CP. This circuit number is stored as a new circuit number NCNO (step 200) for preparation of the occurrence of the circuit switching process, which will be explained hereinafter. Next, the circuit hunt table 33 which controls the circuit used by the relevant call is accessed on the basis of the destination number DNO and circuit priority level CPL in the call control record 36 and a check is made to see if the reservation has been made from another call for this circuit or not (step 204). The presence or absence of the reservation can be determined by comparing the pointers RHP and RTP in the circuit hunt table 33. If no reservation is made, step 208 follows and the circuit control record 34 which is addressed by the pointer CP of the call control record 36 is released and chained by the idle circuit control record chain. On the contrary, if the call itself has reserved to the circuit having the higher priority, the reserved circuit record 35 which is addressed by the reservation table pointer RP is released from the reserved circuit record chain and the reservation is canceled.

If it is determined in discriminating step 204 that the reservation has been made from another call, a reserved circuit record, which is referred as 35' hereinafter to distinguish it from the aforementioned reserved circuit record 35 that refers to the end call itself, indicated by the pointer RHP in the circuit hunt table 33 is released from the reserved circuit record chain (step 210). Next, a call control record 36' corresponding to the call which is using the line of a low priority CPL' addressed by the pointer CTP in the reserved circuit record 35' is obtained (step 212). The circuit number is obtained from a circuit control record 34' which is addressed by the pointer CP in the call control record 36' (step 214). This circuit number is stored as the present circuit number PCNO. In the next step 216, the circuit control record 34' is replaced by the idle circuit control record chain and at the same time, the circuit control record 34 which has at present been released by the completion of the call is chained with the call control record 36'. In step 218, a circuit switching signal 50 indicated in FIG. 5 including the PCNO and NCNO is sent to the partner office through the common channel signal controller 23. Thereafter, a command to switch the busy circuit of the reserve call from the circuit of the PCNO to the circuit of NCNO (step 220) is sent to the switch unit 20.

In FIG. 5, HD denotes a header portion of the signal. For example, the header portion HD includes a start delimiter flag symbol of the signal and a sequence number for flow control of the signal. ADR indicates an address of the signal. The address ADR includes a switching office number on the transmission side of the signal and a switching office number on the reception side. ID represents a signal identifier to indicate that the signal is the circuit switching signal. PCNO and NCNO denote the number of communication circuit which is being used at present and the new communication circuit number on the side to be switched. The last TL denotes a tailer portion of the signal. The tailer portion TL includes an error correction code and an end delimiter flag symbol of the signal.

In the foregoing embodiment, the reservation to switch the communication circuit is made by the switching apparatus on the originating side. When the reservations are controlled on the side of one switching apparatus in this manner, the circuit switching signal is transmitted from only the originating side. Therefore, it is sufficient that the switching apparatus on the terminating side which received the circuit switching signal merely switches the communication circuit on the basis of the information (the present busy circuit number PCNO and the idle circuit number NCNO) in the reception signal. To prevent the erroneous switching based on a signal transfer error, it is desirable that when the switching apparatus on the terminating side received the circuit switching signal, it returns a circuit switching confirmation signal to the originating switching apparatus.

As will be obvious from the above description, according to the present invention, since the communication circuit which is used to talk can be dynamically switched even if the call is in the talking state, the following improvements in communication services can be accomplished.

(1) The switching from the circuit of a low transmission quality to the circuit of a high transmission quality.

(2) The switching from the circuit which is transferred at a long distance to the circuit connected at a short distance.

(3) The switching from the circuit of a high rental fee (e.g., the public circuit) to the circuit of a cheap fee (e.g., the dedicated circuit).

(4) The switching from the circuit of a low transmission efficiency to the circuit of a high transmission efficiency (for example, the circuit of 64 kbps which has been used to transmit the voice is switched to the circuit of 32 kbps, and the voice is compressed and transmitted by the circuit of 32 kbps).

We claim:

1. A circuit switching method for a communication system in which a plurality of switching apparatuses to each of which a plurality of terminal apparatuses are connected are mutually connected through a plurality of circuits having different priorities and through one control signal line to transfer call control signals, said method comprising:

a first step in which a first switching apparatus as one of said plurality of switching apparatuses receives a telephone number to designate a destination terminal apparatus subsequently to a call from one of said plurality of terminal apparatuses connected to said first switching apparatus;

a second step in which the first switching apparatus selects one route directing to a second switching apparatus to which said destination terminal apparatus belongs on the basis of said telephone number;

a third step of hunting a first circuit having the highest priority from the idle circuits included in said selected one route to assign to said call, thereby enabling a communication to be performed between said two terminal apparatuses;

a fourth step in which in the case where a second circuit, which is in a busy state now but, having a higher priority than that of the idle circuit hunted in said third step exists in said selected one route, said first switching apparatus stores a use reservation for said second circuit in conjunction with said call;

a fifth step in which when said second circuit becomes idle, if the use reservation for the second circuit has been stored, said first switching apparatus sends a control signal to change over the circuit to the second switching apparatus through said control signal line; and a sixth step of assigning said second circuit to said call in place of said first circuit.

2. A method according to claim 1, wherein said first switching apparatus has a plurality of circuit hunt table means for managing whether the circuits for every priority are busy or not with respect to said selected one route, and a call control table means for storing a plurality of call records each of which is prepared for every call to show the busy circuit, the priority of said busy circuit, and the telephone number of the destination terminal, and wherein said fourth step includes a step of chaining the call record corresponding to the call which is assigned to said first circuit to one of said circuit hunt table means corresponding to the priority of said second circuit, and wherein said fifth step includes a step of determining the presence or absence of the call for which said first switching apparatus stored the use reservation for the second circuit by referring to the circuit hunt table means corresponding to the priority of the second circuit on the basis of the call record corresponding to a call which has released the second circuit.

3. A communication system in which a plurality of switching apparatuses to each of which a plurality of terminal apparatuses are connected are mutually connected through a plurality of circuits having different priorities and through one control signal line, each of said switching apparatuses comprising:

means which, in response to a telephone number input from the terminal apparatus which generated a call that is connected to said switching apparatus, selects one route directing to a destination switching apparatus enclosing a destination terminal apparatus to which said telephone number is assigned;

means for hunting an idle circuit having the highest priority from a plurality of circuits included in said selected one route;

means which, upon completion of a call, in the route to which a first circuit to be released by said call belongs, determines whether a call using a second circuit having a lower priority than that of said first circuit exists or not; and means which, when the call using the second circuit of the lower priority has been found out by said determining means, communication with the partner switching apparatus of said call through said control signal line and, thereafter, switches the busy circuit of said call from the second circuit to the first circuit.

* * * * *